(12) United States Patent
Kanto

(10) Patent No.: US 12,544,871 B2
(45) Date of Patent: Feb. 10, 2026

(54) DISPLAY DEVICE, MACHINE TOOL, AND LIQUID EJECTION METHOD

(71) Applicant: DMG MORI CO., LTD., Nara (JP)

(72) Inventor: Kenta Kanto, Nara (JP)

(73) Assignee: DMG MORI CO., LTD., Nara (JP)

( * ) Notice: Subject to any disclaimer, the term of this patent is extended or adjusted under 35 U.S.C. 154(b) by 547 days.

(21) Appl. No.: 17/779,196

(22) PCT Filed: Nov. 27, 2020

(86) PCT No.: PCT/JP2020/044156
§ 371 (c)(1),
(2) Date: May 24, 2022

(87) PCT Pub. No.: WO2021/107075
PCT Pub. Date: Jun. 3, 2021

(65) Prior Publication Data
US 2022/0402082 A1 Dec. 22, 2022

(30) Foreign Application Priority Data

Nov. 29, 2019 (JP) ................................ 2019-216749

(51) Int. Cl.
*B23Q 11/00* (2006.01)
*H04N 7/18* (2006.01)

(52) U.S. Cl.
CPC ......... *B23Q 11/0042* (2013.01); *H04N 7/183* (2013.01)

(58) Field of Classification Search
CPC .. B23Q 11/0042; B23Q 11/10; B23Q 1/2409; B23Q 17/249; G05B 19/042; H04N 7/183; Y02P 70/10
See application file for complete search history.

(56) References Cited

U.S. PATENT DOCUMENTS

| | | | |
|---|---|---|---|
| 5,313,743 A | * | 5/1994 | Peschik .................. B24B 55/02 451/449 |
| 6,107,768 A | | 8/2000 | Ouchi et al. |

(Continued)

FOREIGN PATENT DOCUMENTS

| | | |
|---|---|---|
| CN | 110193752 A | 9/2019 |
| JP | H07108435 A | 4/1995 |

(Continued)

OTHER PUBLICATIONS

Supplementary European Search Report, Nov. 2, 2023, European Patent Application No. 20894575.8, 9 pages.

(Continued)

*Primary Examiner* — Kidest Worku
(74) *Attorney, Agent, or Firm* — Stinson LLP

(57) ABSTRACT

A display device, a machine tool, and a liquid ejection method with which a liquid ejection path for efficient chip removal can be created, without performing huge control process. The display device is for displaying an image in order to eject a liquid and move chips generated from a workpiece in a machine tool. The machine tool includes a liquid ejection unit that ejects a liquid so as to move chips generated from a workpiece, and an imaging unit that captures an image of a target area in which chips generated from a workpiece are to be detected in the machine tool. The liquid is ejected to the target area, based on a first position and a second position in the image captured by the imaging unit. The display device includes: a display unit that displays an image captured by the imaging unit; a detection unit that detects a first input signal corresponding to the first position in the image displayed on the display unit, and a second input signal corresponding to the second position in the displayed image; and a transmission unit that transmits the detected first and second input signals to a signal generation unit, the signal generation unit generating a control signal (Continued)

that controls to create a liquid ejection path in the target area, based on the first and second positions, for ejecting a liquid, based on the liquid ejection path.

6 Claims, 12 Drawing Sheets

(56) References Cited

U.S. PATENT DOCUMENTS

| | | | |
|---|---|---|---|
| 2002/0003415 | A1 | 1/2002 | Nakai et al. |
| 2006/0178771 | A1* | 8/2006 | Kluft .................. G05B 19/4065 700/177 |
| 2015/0231672 | A1 | 8/2015 | Haremaki et al. |
| 2016/0184945 | A1* | 6/2016 | Saitou ................ B23Q 17/2476 414/222.02 |
| 2016/0256968 | A1 | 9/2016 | Furukawa et al. |
| 2016/0263687 | A1 | 9/2016 | Matsunaga et al. |
| 2016/0339553 | A1* | 11/2016 | Nakazawa ........... B25J 11/0085 |
| 2017/0043442 | A1* | 2/2017 | Takikawa ................ B05B 15/60 |
| 2017/0144262 | A1 | 5/2017 | Okuda |
| 2017/0165803 | A1 | 6/2017 | Nakayama |
| 2018/0354000 | A1* | 12/2018 | Takikawa .................. B08B 5/02 |
| 2019/0039198 | A1 | 2/2019 | Sugiura |
| 2019/0120771 | A1 | 4/2019 | Oota et al. |
| 2019/0196454 | A1 | 6/2019 | Tarui |

FOREIGN PATENT DOCUMENTS

| | | |
|---|---|---|
| JP | 2003-289427 A | 10/2003 |
| JP | 2007136352 A | 6/2007 |
| JP | 2015-24455 A | 2/2015 |
| JP | 2016-124054 A | 7/2016 |
| JP | 2016120589 A | 7/2016 |
| JP | 2017-013182 A | 1/2017 |
| JP | 2018-24094 A | 2/2018 |
| JP | 2018183866 A | 11/2018 |
| JP | 2019198915 A | 11/2019 |

OTHER PUBLICATIONS

International Search Report, PCT/JP2020/044156, dated Feb. 22, 2021, 11 pages.

Written Opinion, PCT/JP2020/044156, dated Feb. 22, 2021, 6 pages.

Japanese Office Action issued in the correspondingJapanese Patent Application No. 2019-216749, mailed Jul. 7, 2020, and its English Machine Translation.

Japanese Office Action issued in the correspondingJapanese Patent Application No. 2019-216749, mailed Nov. 12, 2020, and its English Machine Translation.

* cited by examiner

DISPLAY DEVICE, MACHINE TOOL, AND LIQUID EJECTION METHOD

REFERENCE TO RELATED APPLICATIONS

This application is the 371 U.S. national stage application of International Patent Application No. PCT/JP2020/044156, filed Nov. 27, 2020, which claims the benefit of Japanese Patent Application No. 2019-216749, filed Nov. 29, 2019, the entire disclosures of which are incorporated herein by reference.

TECHNICAL FIELD

The present disclosure relates to a display device for displaying chips generated during machining of a workpiece in a machine tool, a machine tool, and a liquid ejection method.

BACKGROUND ART

Machining a workpiece, which is a machining object, in a machine tool generates chips. As the chips accumulate and build up, the machining becomes difficult to continue. It has been therefore necessary to stop the operation of the machine tool periodically, and remove the chips manually with an air blower or the like, resulting in a decrease in the operational efficiency of the machine tool. Therefore, removing the chips without manual operation has been required.

As a technique to enable this, Patent Literature 1 discloses a machine tool configured to eject a liquid to remove the chips, by comparing a template image inside the machine tool acquired in advance, with an image captured after the machining of a workpiece, and from the difference in brightness between the images, identifying a place from which the chips have to be removed.

CITATION LIST

Patent Literature

[PTL 1] Japanese Laid-Open Pat Publication No. 2016-120589

SUMMARY OF INVENTION

Technical Problem

The state inside the machine tool is different between before and after the machining. This is also due to the factors other than the chips (e.g., a coolant having been ejected during machining). In addition, depending on the shape of the workpiece, the peripheral brightness also differs. Therefore, when using the difference in the state inside the machine tool before and after the machining for the place identification as in Patent Literature 1, it is necessary to create a template image and set an appropriate threshold value related to the brightness for each workpiece, which requires huge control process to determine a liquid ejection path.

It is an object of the present disclosure to provide a technique with which a liquid ejection path for efficiently moving chips can be created, without performing huge control process.

Solution to Problem

In view of the above, the present disclosure provides a technique as recited in the claims.

Advantageous Effects of Invention

According to the present disclosure, it is possible to create a liquid ejection path for efficiently moving chips, without performing huge control process.

DESCRIPTION OF EMBODIMENTS

Description will be given below of embodiments of the present disclosure, with reference to the drawings.

Figure 1A:
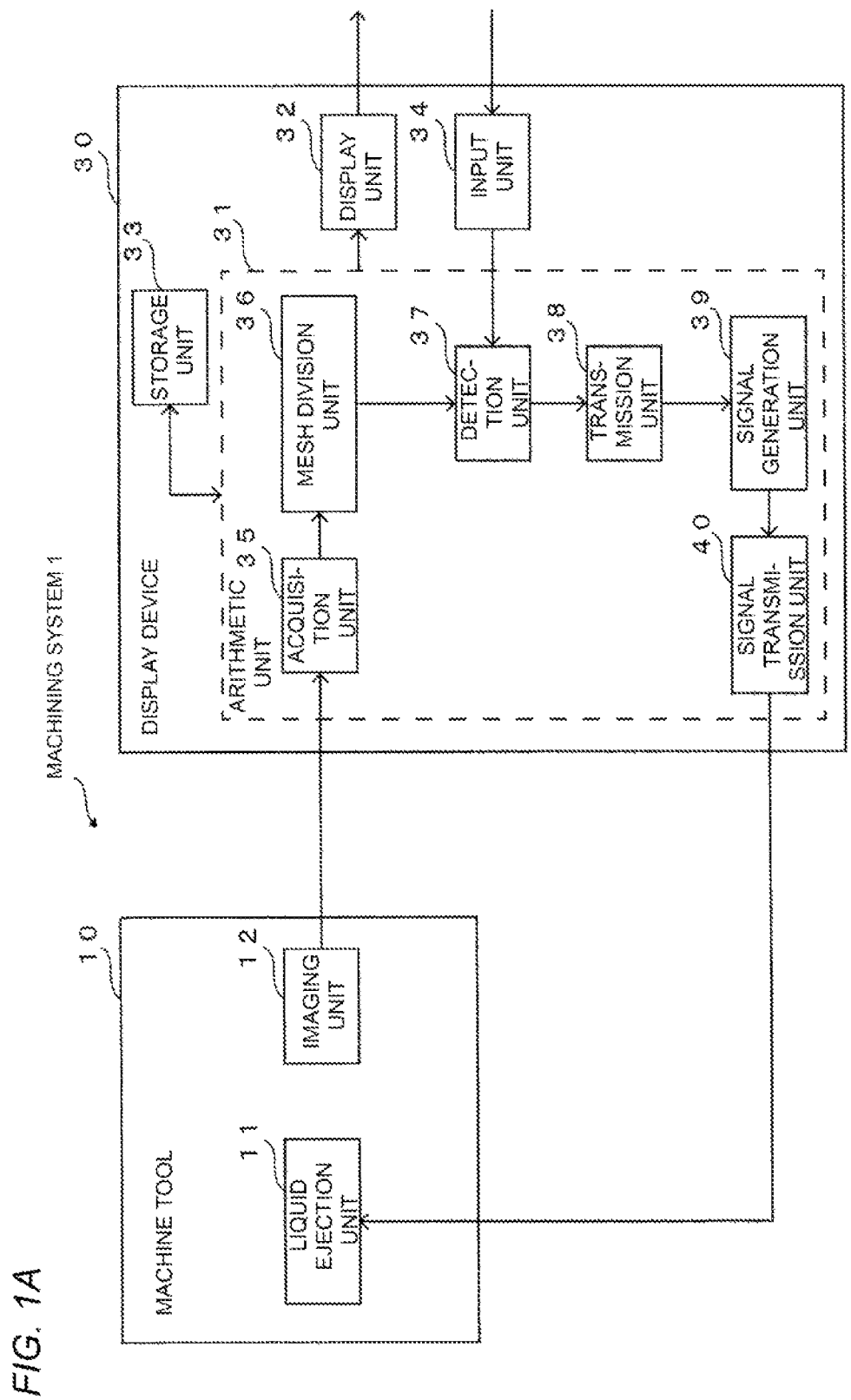
FIG. 1A A block diagram showing a configuration of an embodiment of a machining system.

FIG. 1A shows a configuration of a machining system 1 according to the present embodiment. The machining system 1 includes a machine tool 10 and a display device 30. The machine tool 10 performs a machining, such as cutting and grinding, on a workpiece which is a machining object delivered into the machine tool. When a machining is performed on the workpiece, some portions of the workpiece are separated, to generate chips, which accumulate inside the machine tool 10.

(Machining System)

The machine tool 10 includes a liquid ejection unit 11 and an imaging unit 12. The liquid ejection unit 11 includes, for example, a nozzle capable of ejecting a liquid, an actuator for driving the nozzle, and a pump for pumping up a liquid from a liquid reservoir in which a liquid is stored. By ejecting a liquid from the nozzle to the chips, the aforementioned chips can be moved onto a chip conveyor or the like installed outside the machining region, so that the chips can be eventually removed from the machining region. The liquid may be a coolant for cooling and lubricating parts that generate heat during machining, such as a workpiece and a main shaft which is a machining instrument, but not limited thereto, and other liquids may be used. In the following, in the present specification, the description is given provided that the liquid for moving chips is a coolant. In the liquid ejection unit 11, changes can be made to the nozzle position, the coolant ejection direction of the coolant from the nozzle, the coolant ejection pressure, and the like. The liquid ejection unit 11 preferably has a plurality of nozzles. With one nozzle, the liquid ejection region will have a space region that is hidden by a component of the machine tool. Having entered this space region, the chips are difficult to be moved, because the liquid flow from the nozzle cannot sufficiently act on the chips.

The imaging unit 12 is, for example, a camera equipped with an imaging element, such as a CCD or a CMOS, and can capture an image inside the machine tool 10. The imaging unit 12 is placed in the machining region in the machine tool 10. The imaging unit 12 is fixed, for example, at an upper portion in the machine tool 10. Desirably, the imaging unit 12 (camera) placed in the machining region is fixed at such an angle of view that the image of at least part of horizontal surfaces and at least part of side surfaces defining the machining region can be captured by one shot. The imaging unit 12 placed in the machining region may be fixed and placed at such an angle of view that the image of the horizontal surfaces and the side surfaces which entirely include the machining region, including the surface of a table on which the workpiece is placed, can be captured by one shot.

The imaging unit 12 can output the captured image to the display device 30 as described later. The machine tool 10 may include a plurality of the imaging units 12 within the machine tool, depending on the performance and the image capture area of the imaging unit 12. The machine tool 10 according to the present embodiment can include two imaging units 12. When two imaging units 12 are included, too, by arranging them such that the image of a region that cannot be captured by one imaging unit can be captured by the other imaging unit, the whole machining region in the machine tool can be checked from the images captured by the imaging units.

The display device 30 includes: an arithmetic unit 31 that processes an image captured by the imaging unit 12 of the machine tool 10 and creates a coolant ejection path; a display unit 32 that displays an image captured by the imaging unit 12; a storage unit 33 that stores, as necessary, information to be processed by the arithmetic unit 31, such as images and positions; and an input unit 34 that outputs an input signal to the arithmetic unit 31. The display device 30 is a device having a function of receiving and displaying an image, such as a computer or a tablet. The display device 30 can also be referred to as an information processing device. The display device 30 and the machine tool 10 can perform wired or wireless communication. The display device 30 may be included in the machine tool 10.

Figure 1B:
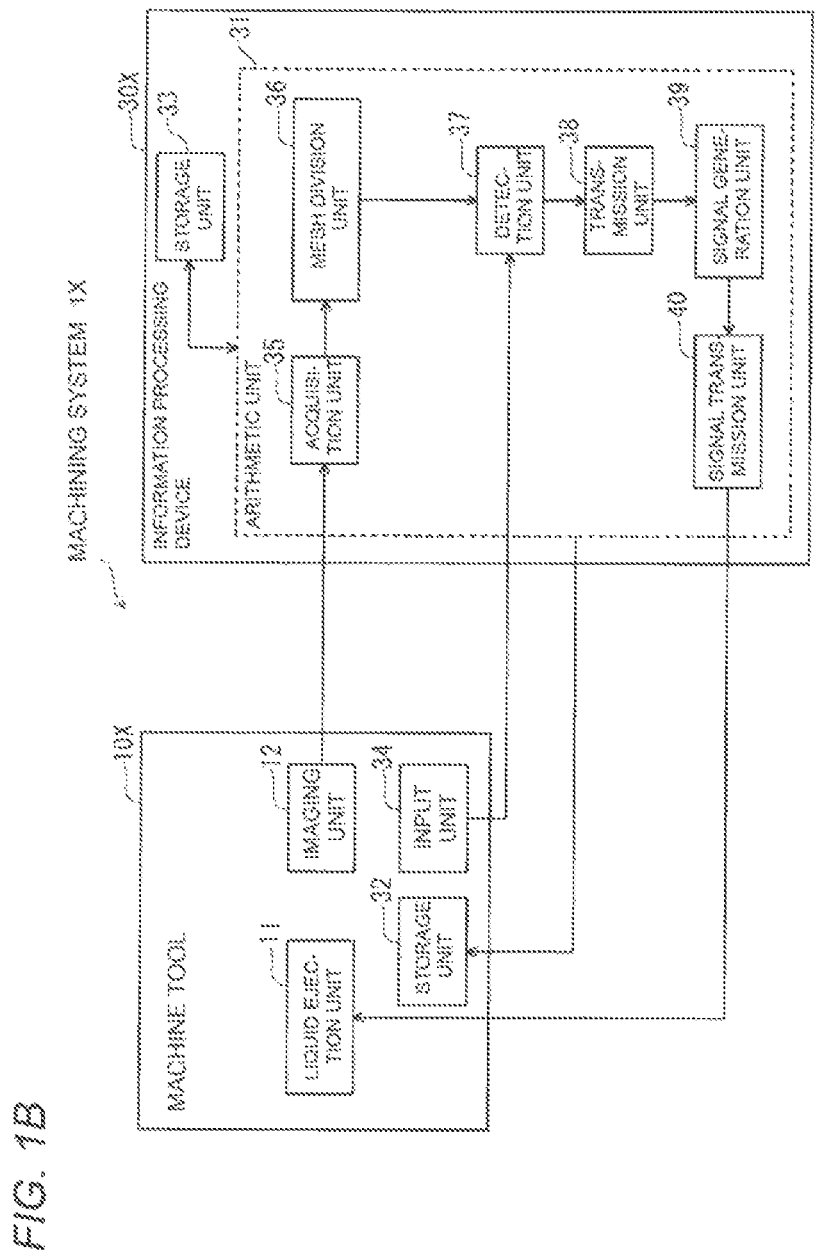
FIG. 1B A block diagram showing a configuration of another embodiment of the machining system.

FIG. 1B shows a configuration of a machining system 1X in another embodiment. The machining system 1X includes a machine tool 10X and an information processing device 30X. The information processing device 30X includes: an arithmetic unit 31 that acquires (receives) and processes an image captured by an imaging unit 12 of the machine tool 10X and creates a coolant ejection path; and a storage unit 33 that stores, as necessary, information to be processed by the arithmetic unit 31, such as images and positions. The information processing device 30X can also be referred to as an image processing device. On the other hand, the machine tool 10X includes: a display unit 32 that displays an image captured by the imaging unit 12 and an image created through processing at the arithmetic unit 31; and an input unit 34 that outputs an input signal to the arithmetic unit 31. The display unit 32 and the input unit 34 may be included in an operation panel of the machine tool 10X. The display unit 32 and the input unit 34 may be both installed in each of the information processing device 30X and the machine tool 10X, so that the operator can select and use any of the display units 32 and the input units 34.

The display unit 32 is, for example, a computer display, or an operation panel monitor of the machine tool 10X, on which an image that has been captured by the imaging unit 12 of the machine tool 10 and has been output to the display device 30 or the information processing device 30X can be displayed. Also, an image processed by the arithmetic unit 31 in relation to the captured image may be displayed. For example, a mesh created in a mesh division unit 36 as described later may be displayed in combination. In another possible configuration, information, such as the presence or absence of chips and the amount of chips, may be displayed on mesh regions defined by the aforementioned mesh. The mesh regions may be associated with the information on the presence of the chips. For the processing as described later, the display unit 32 may be, for example, a touch screen which allows the operator to directly input instructions on the basis of the displayed image by touching the image, such as a resistive type display or a capacitive type display.

The input unit 34 is, for example, a mouse which is a common input device to a computer, and in the display device 30 or the display unit 32, the operator can input some kind of instruction, such as position information, via the input unit 34. The input unit 34 outputs the above instruction as an input signal, to a detection unit 37. In a touch screen, a mechanism for detecting a position touched by the operator, which is a part of the aforementioned display or the like, can correspond to the input unit 34 (and a detection unit 37 as described later).

The arithmetic unit 31 includes an acquisition unit 35, a mesh division unit 36, a detection unit 37, a transmission unit 38, a signal generation unit 39, and a signal transmission unit 40. The arithmetic unit 31 and each of the processing units 35 to 40 included in the arithmetic unit 31 include a general-purpose processor, such as a CPU or an MPU, that implements a predetermined function by executing a program. The arithmetic unit 31 and each of the processing units 35 to 40 included in the arithmetic unit 31 realize various processing operations in the display device 30 or the information processing device 30X by, for example, invoking and executing the control program stored in the storage unit 33. The arithmetic unit 31 and each of the processing units 35 to 40 included in the arithmetic unit 31 are not limited to the one that realizes a predetermined function through collaboration with hardware and software, and may be a hardware circuit specifically designed to realize a predetermined function. That is, the arithmetic unit 31 and each of the processing units 35 to 40 included in the arithmetic unit 31 can be realized by various processors, such as a CPU, an MPU, a GPU, an FPGA, a DSP, and an ASIC.

The acquisition unit 35 acquires an image captured by the imaging unit 12 and outputs the image to the mesh division unit 36.

The mesh division unit 36 can divide at least part of the image captured by the imaging unit 12 into a plurality of mesh regions. The mesh regions are divided regions of the captured image defined by a predetermined geometric shape (mesh). The imaging unit 12 performs imaging in the image capture area including a chip scattering area in which chips generated through machining may scatter. When an image is captured with the chip scattering area included, a plurality of chips may be included in the image. Analysis of them throughout the entire image takes time. To address this, the image is divided into mesh regions to calculate a probability for each mesh region, and on the basis of the probability, the presence or absence of the chips is determined. For example, when there are lots chips, the probability reaches 90 or so, with the maximum probability taken as 100, and when there are no chips, the probability drops to 20 or less. When the probability for one mesh region is greater than 20 and less than 70, it can be set such that there are a few chips. In this way, the presence or absence of the chips can be determined all at once by widely photographing the machining region.

Figure 2:
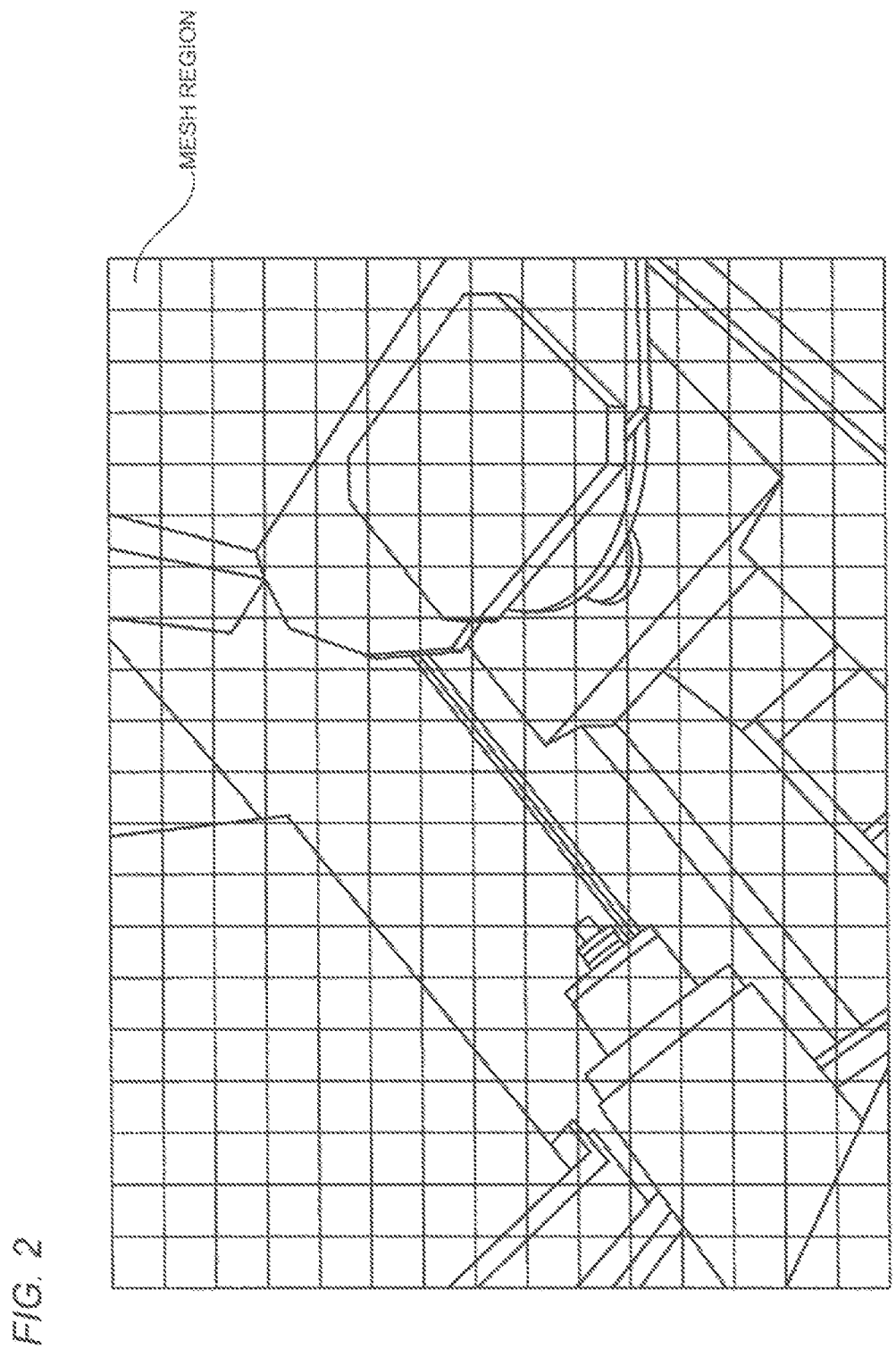
FIG. 2 A diagram illustrating an example of mesh regions.

FIG. 2 is a diagram showing a captured image of the inside of the machine tool 10 divided into square mesh regions. Such an image constituted of a plurality of mesh regions can be called a mesh image. The size and shape of the mesh that defines the image may be configured to be adjustable as necessary. By dividing into mesh regions like this, it becomes easy for the operator to instruct positions. Note that the mesh regions are not necessarily divided regions, and may be regions segmented by a mesh on a captured image. That is, a combination of a captured image and a mesh stored as separate data is also referred to as a mesh image. The mesh regions are output to the display unit 32 and the detection unit 37. The present machining system may be configured without including the mesh division unit 36, and in this case, the captured image acquired by the acquisition unit 35 is output to the display unit 32 and the detection unit 37.

The detection unit 37, on the basis of the image displayed on the display unit 32, receives a signal including a position information output from the input unit 34, which has been input by the operator by operating the input unit 34. Therefore, when the chips are determined as present by the operator on the basis of the image captured by the imaging unit 12, the chip accumulated position instructed by the operator via the input unit 34 can be detected. When there are a plurality of instructed positions, the detection unit 37 detects a plurality of input signals according to the number of the instructed positions. For example, when there are two instructed positions, a first input signal corresponding to the first instructed position and a second input signal corresponding to the second instructed position are detected. Upon detection of the input signals to the predetermined positions, the detection unit outputs each of the input signals to the transmission unit 38. Each of the input signals includes at least the information of the predetermined position instructed by the operator. Furthermore, from the above input signals, the order in which the instructions are input by the operator can be distinguished. Each of the instructed positions is within the two-dimensional image displayed on the display unit 32. Each of the instructed positions is associated with the actual position in the three-dimensional space in the machine tool. Differing from the coordinate system in the image, an actual position in the machine tool is determined by coordinates (X, Y, and Z-axes), with the Z-axis direction being the main shaft direction. That is, each of the instructed positions is associated with the X, Y, and Z coordinates in the machine tool.

For example, when the input unit 34 is a mouse as described above, the detection unit 37 can detect the position instructed by the operator using the mouse. The input unit 34 and the detection unit 37 may be configured integrally. In this case, for example, when the display unit 32 is a touch screen as described above, the input unit 34 and the detection unit 37 can detect the position touched (or, input) by the operator on the touch screen. The detection unit 37 may detect an instructed position based on the mesh regions created by the mesh division unit 36. That is, the detection unit 37 may detect an input signal in association with the mesh regions. For example, when having detected the input signal at a position within one mesh region, the detection unit 37 may detect an instructed position as referring to the whole one mesh region. When a plurality of mesh regions including a first mesh region and a second mesh region are created by the mesh division unit 36, the detection unit 37 may detect a first input signal corresponding to the first instructed position in the image displayed on the display unit 32, in association with the first mesh region associated with the information on the presence of the chips, while detecting a second input signal corresponding to the second instructed position in the displayed image, in association with the second mesh region associated with the information on the presence of the chips. The information on the presence of chips may be the presence probability of the chips in each mesh region, or may be the presence or absence of the chips or the amount of the chips. The presence or absence of the chips or the amount of the chips may be judged or determined from the presence probability of the chips in each mesh region. The information may be historical data on experience, and the like, or may be a learning model based on the data collected by machine learning regarding the presence or absence and the amount of the chips. The learning model can, for example, calculate and output information on the presence of the chips or the amount of the chips in the mesh region, when one of the mesh regions created by the mesh division unit 36 is input as an input signal.

The transmission unit 38 transmits each of the detected one or more input signals to the signal generation unit 39.

Although the details will be described later, the signal generation unit 39 creates a coolant ejection path within a target area, on the basis of a plurality of instructed positions (e.g., the first and second instructed positions) (i.e., on the basis of the coordinates in the machine tool associated with the first and second instructed positions), and generates a control signal. The control signal is a signal that controls to eject a coolant on the basis of the ejection path. When one position is instructed, a control signal may be generated such that a coolant is ejected to the position, or alternatively, a coolant ejection path may be formed by a predetermined algorithm according to the instructed position, and then, a control signal may be generated. When forming a coolant ejection path, with the information on the presence of the chips taken into consideration, a control signal may be generated such that, for example, a coolant is ejected in a large amount to the instructed position with much accumulation of chips. For example, the control signal may be generated so as to control the nozzle to stay at a predetermined instructed position or to change its moving speed along a predetermined path.

The signal transmission unit 40 transmits a coolant control signal to the liquid ejection unit 11. In accordance with the control signal, the liquid ejection unit 11 of the machine tool 10 ejects a coolant by driving the nozzle so as to eject the coolant forward along the tangential direction of the ejection path. When the machine tool 10 and the display device 30 are configured integrally, the present machining system 1 may be configured without including the signal transmission unit 40, to directly output a signal from the signal generation unit 39 to the liquid ejection unit 11.

The storage unit 33 is a recording medium that records various information. The storage unit 33 is realized by, for example, a DRAM, an SRAM, a flash memory, an MRAM, a ReRAM, an FeRAM, an SSD (Solid State Device), a hard disk, and other storage devices, either singly or in combination. The storage unit 33 can store the captured image acquired by the acquisition unit 35, the mesh region (mesh image) created by the mesh division unit 36, the information of one or more predetermined positions detected by the detection unit 37, the coolant ejection path created by the signal generation unit 39, and the like. In addition, each processing unit of the arithmetic unit 31 can read, as necessary, images, information, signals, and the like stored in the storage unit 33. In the present specification, the description is given provided that an input of an image or the like to each processing unit, and an output of the image or the like processed or created by the each processing unit are directly input from a certain processing unit to the each processing unit and are directly output from the each processing unit to another processing unit, respectively. However, this is not a limitation, and each processing unit of the arithmetic unit 31 may read an image or the like from the storage unit 33 at the time of image processing or signal detection, or the image processed or created and the information created in the each processing unit may be stored in the storage unit 33.

Figure 3:
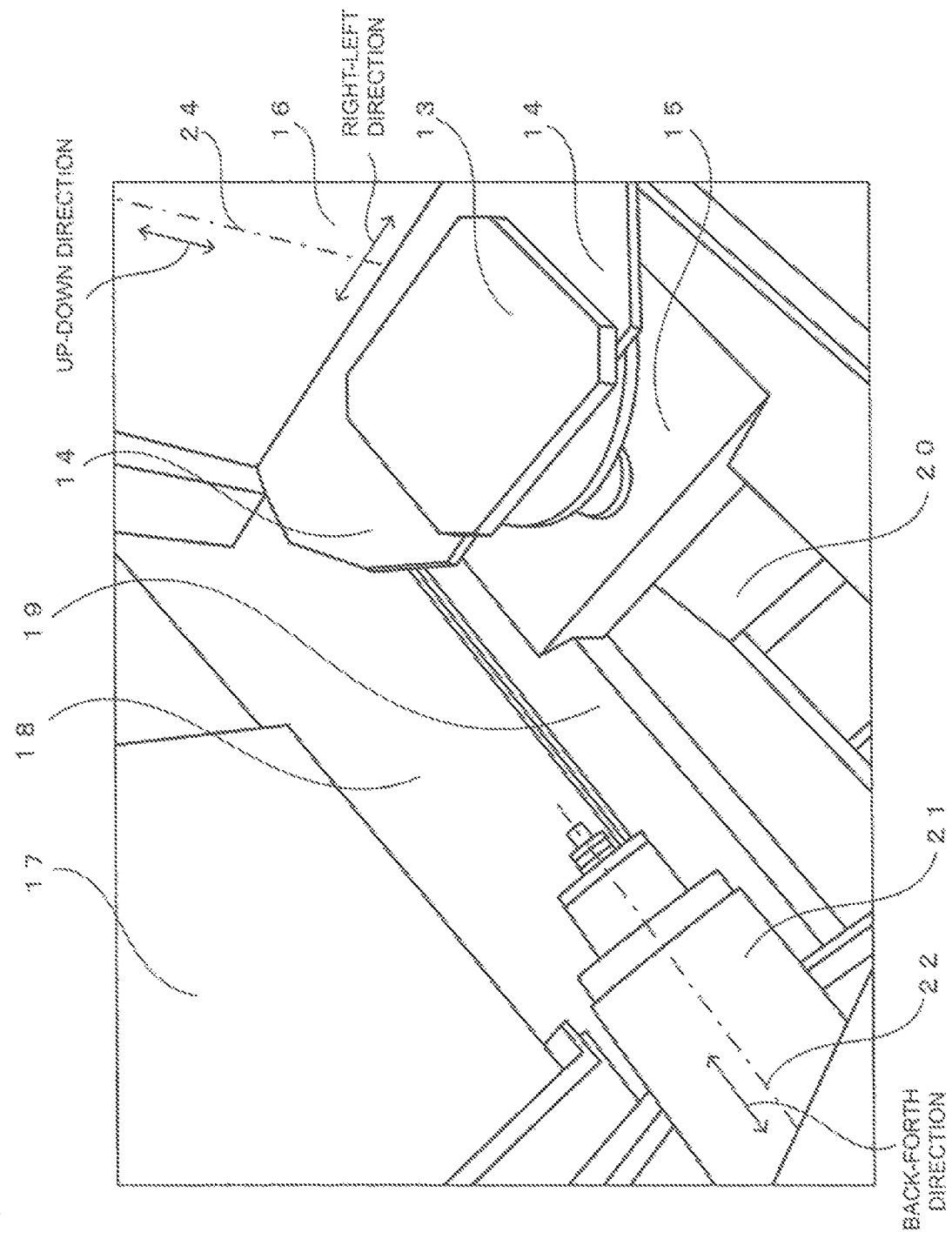
FIG. 3 A schematic diagram of a captured image of the inside of a machine tool.

FIG. 3 shows a captured image of the inside of the machine tool 10, in which a pallet 13, a cover 14, a table 15, a revolving door 16, a side surface 17, a sloped surface 18, a protector 19, a chute 20, and a main shaft 21 are shown. In the present embodiment, with a longitudinal axis 22 of the main shaft 21 shown in FIG. 3 taken as the front and rear directions inside the machine tool 10, the root end side of the main shaft 21 is referred to as the front side, and the tip end side thereof is referred to as the rear side. The horizontal direction orthogonal to the longitudinal axis 22 is referred to as the right and left directions, and the vertical direction orthogonal to the longitudinal axis 22 is referred to as the up and down directions.

The imaging unit 12 captures an image of a target area including a side surface and a horizontal surface in the machine tool 10 by one shot. The imaging unit 12 is fixed at an upper portion in the machine tool. This makes it possible to perform imaging over a wide area including a side surface and a horizontal surface in the machine tool, inclusive of a chip scattering area in which chips generated during machining may scatter. By using the image recognition by the operator, a liquid ejection path that enables efficient chip movement can be created. However, when with the imaging unit 12 attached, for example, at the tip end of a robot arm, imaging or cleaning is performed while moving the robot arm, it is difficult to perform imaging over a wide area including a side surface and a horizontal surface in the machine tool, and also difficult to use the image recognition by the operator. The display device 30 or the display unit 32 may be a device or unit that displays an image captured by the imaging unit 12, except when the imaging unit 12 performs imaging while the target area is irradiated with laser beams.

The pallet 13 is a table on which the workpiece 23 is placed and secured. The machine tool 10 can include a plurality of pallets 13. In this case, when changing the workpiece to be processed, the workpiece can be changed by replacing the pallet 13, which is time effective.

The cover 14 is a component situated on the right and left sides of the pallet 13 in FIG. 3, and when the below-described revolving door 16 revolves to replace the pallet 13, for example, the cover lifts up the pallet 13 and separates it from the table 15. In the present embodiment, the cover 14 is fixed to the revolving door 16.

The revolving door 16 can revolve about an axis 24. When revolving, the cover 14 separates the pallet 13 from the table 15, and the revolving door 16 revolves together with the pallet 13 and the cover 14. In this way, the pallet 13 with the processed workpiece thereon can be delivered out into a pallet stocker 25, and another pallet 13 with a workpiece to be processed next secured thereon can be loaded into the machine tool from the pallet stocker. The cover 14 may be attached to the revolving door both on its machine tool inner side and on its stocker side, so that the delivery and loading of the pallet can be done simultaneously when the revolving door revolves by 180 degrees.

The side surface 17 is an openable and closable wall of the machine tool 10. The side surface 17 defines the inside and the outside of the machine tool 10, and when the side surface 17 is open, the operator can enter the inside of the machine tool 10. A side surface 26 (not shown) at a position facing the side surface 17 defines the inside of the machine tool 10 and a tool stocker 27. The tool stocker 27 stores a plurality of tools, and during the machining, the side surface 17 opens as necessary, so that the tool attached to the main shaft 21 can be replaced with another tool stored in the tool stocker 27.

The chute 20 is a place into which the chips flow by cleaning. The sloped surface 18 and the protector 19 are provided below the revolving door 16 and the side surfaces 17 and 26, and are each inclined toward the chute so that the chips can easily flow into the chute 20.

With a tool attached to its tip, the main shaft 21 is rotated about the longitudinal axis 22 thereof, by which the workpiece can be processed. In the present embodiment, as shown in FIG. 3, the main shaft 21 has a cylindrical outer shape.

(Creation of Coolant Ejection Path)

A description will be given below of a method of creating a coolant ejection path, with reference to FIGS. 4A, 4B, 5A, 5B, 6A, and 6B.

Figure 4A:
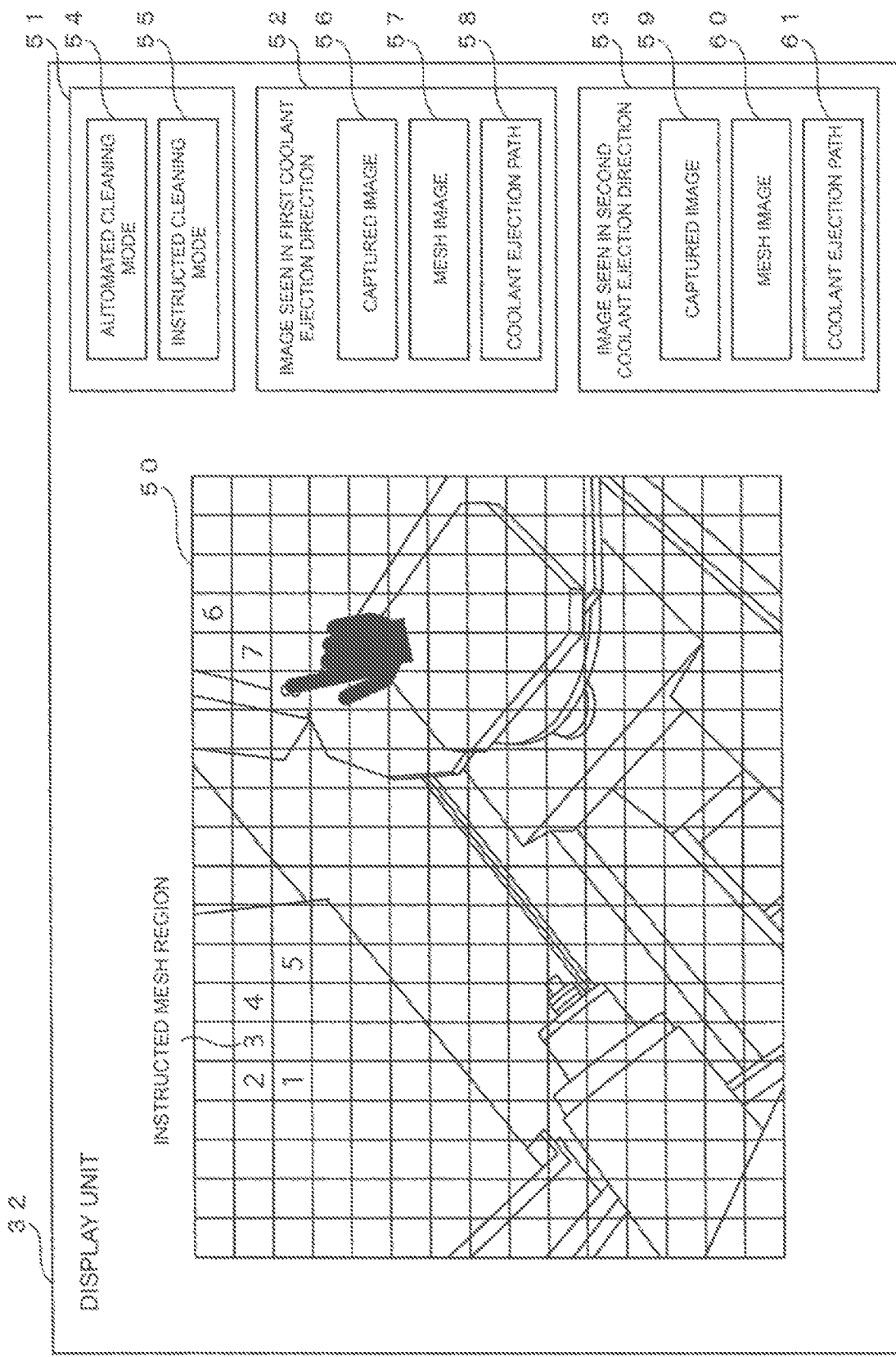
FIG. 4A A diagram illustrating an example of a display unit of a machining system displaying a coolant ejection path.

FIG. 4A illustrates an example of the display unit 32 of the machining system 1 configured to perform automated cleaning and instructed cleaning. The display unit 32 includes a screen section 50 that displays a captured image or a mesh image, a mode selection area 51, a first image selection area 52, and a second image selection area 53. Each of the selection areas 51 to 53 includes a region (selection section) on which a cleaning mode and an image to be displayed on the screen section 50 can be selected by the operator by inputting instructions (e.g., when the display unit 32 is a touch screen, by touching the display unit 32) which are then detected by the detection unit 37. The mode selection area 51 includes an automated cleaning mode selection section 54 and an instructed cleaning mode selection section 55. By selecting the selection section 54 or 55, the cleaning mode can be switched to the automated cleaning mode or the instructed cleaning mode.

The present embodiment includes two imaging units 12, and the first image selection area 52 displays an image as viewed from one of the two. The image indicates the ejection direction of a first coolant to be ejected from one of the liquid ejection units 11. The first image selection area 52 includes a capture image selection section 56, a mesh image selection section 57, and a coolant ejection path selection section 58. When the operator selects the capture image selection section 56, an image captured by the imaging unit 12 is displayed on the screen section 50. When the mesh image selection section 57 is selected, a mesh image created by the mesh division unit 36 is displayed on the screen section 50.

The second image selection area 53 displays an image as viewed from the other imaging unit 12 different from the image displayed in the first image selection area 52. The image indicates the ejection direction of a second coolant to be ejected from the other liquid ejection unit 11. The second image selection area 53 includes a capture image selection section 59, a mesh image selection section 60, and a coolant ejection path selection section 61, and the selection sections 59 to 61 operate similarly to the selection sections 56 to 58 of the first image selection area 52.

For example, in the instructed cleaning mode, the operator can instruct predetermined positions (including the first and second positions) (by, for example, touching the screen section 50), on the captured image or the mesh image displayed on the screen section 50. FIG. 4A is an illustration on which the position instruction made by the operator is reflected on a mesh image created by the mesh division unit 36 from an image inside the machine tool 10 captured by the imaging unit 12. The mesh regions marked with the numbers on the screen section 50 of FIG. 4A are the positions instructed by the operator, and the number increases in the order as instructed by the operator. By using the image recognition by the operator in this way, it is possible to create a liquid ejection path that enables efficient chip removal. The operator may instruct a position, for example, after checking the image displayed on the display unit 32 for the presence or absence of chips generated through the machining of the workpiece 23, or may instruct a place where it is empirically known that chips tend to accumulate. The detection unit 37 detects the instructed position and the order of each mesh region, as an input signal, and outputs the input signal to the transmission unit 38. The transmission unit 38 transmits the signal to the signal generation unit 39.

Figure 4B:
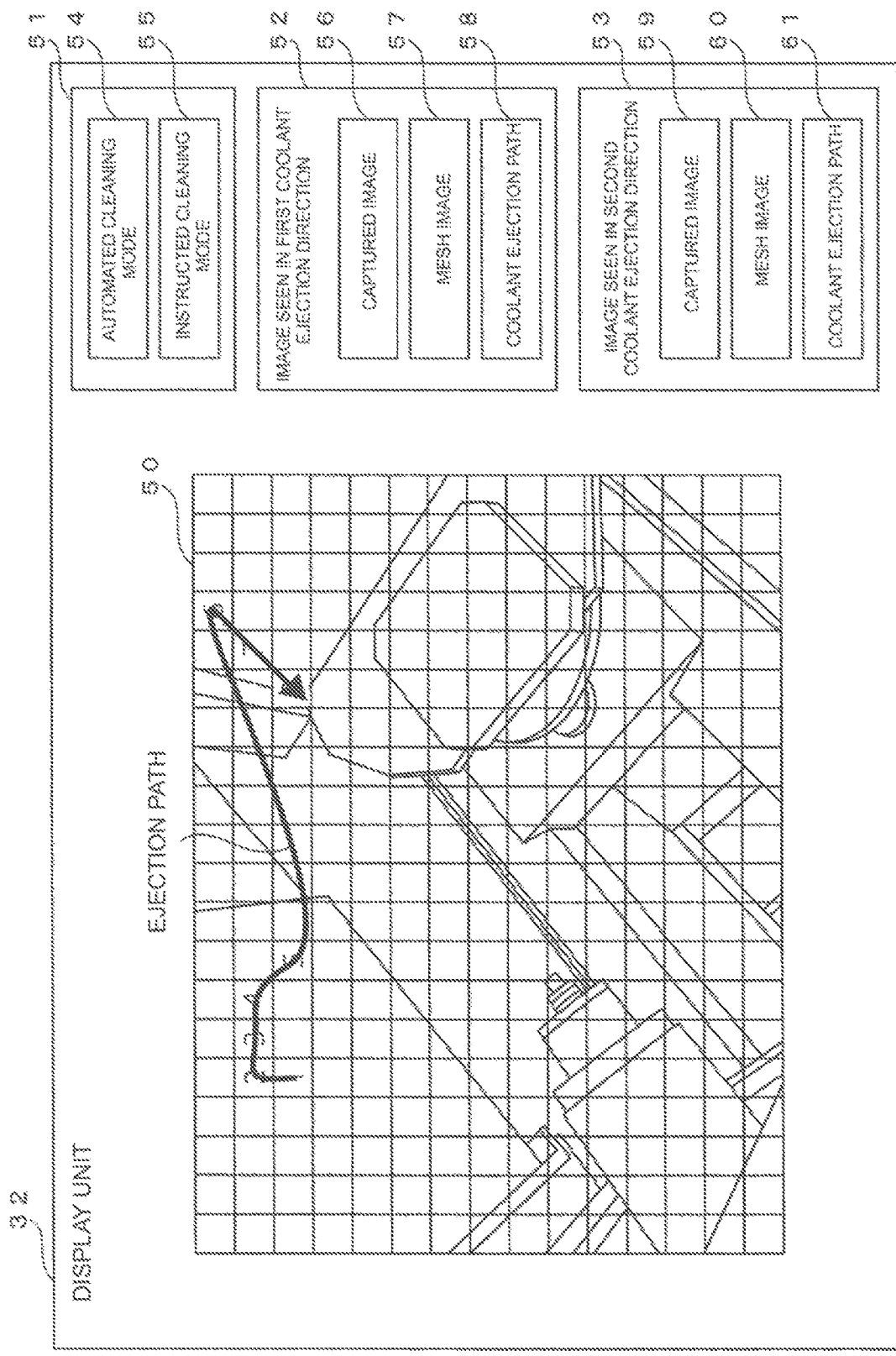
FIG. 4B A diagram illustrating an example of a display unit of a machining system displaying a coolant ejection path, which corresponds to the coolant ejection path of FIG. 4A.

The signal generation unit 39 can create a coolant ejection path in the target area, for example, in the order as instructed on the basis of a plurality of input signals. Hereinafter, this method is referred to as a first ejection path creation method. FIG. 4B illustrates an example of the coolant ejection path created by the first ejection path creation method, in corresponding to the mesh regions in FIG. 4A. The ejection path according to the present method is created so as to pass through the mesh regions having been input as an instructed positions including the first and second positions, in the order as instructed by the operator. When the coolant ejection path selection section 58 is selected, the above coolant ejection path is displayed on the screen section 50. The coolant ejection path may be displayed on the captured image or may be displayed on the mesh image. This allows the operator to confirm the coolant ejection path. That is, the display unit 32 displays (a) an image captured by the imaging unit 12, (b) a first position, and (c) a second position. The display unit 32 may display (a) the image, (b) the first position, (c) the second position, overlappingly with (d) an ejection path connecting the first position and the second position. This allows the operator to easily recognize each image and the ejection path. When the ejection path is the same as assumed, a control signal that controls coolant ejection by driving the nozzle so as to eject a coolant forward along the tangential direction (along the traveling direction) is generated, and output to the signal transmission unit 40. When the ejection path is not the same as assumed, the created ejection path can be cancelled, and positions can be instructed again to the display unit 32. In order to create a plurality of ejection paths, it may be configured such that positions can be successively instructed to the display unit 32.

In the present embodiment, the display unit 32 includes the screen section 50 and the selection sections 54 to 61. The display unit 32 may include only the screen section 50, and the other selection sections may be each configured as a mechanical switch.

Although detailed description thereof is omitted, in the machining system 1, the arithmetic unit 31 may include a chip recognition unit that automatically recognizes the chips from a captured image or a mesh image. With such a configuration, in the automated cleaning mode, for example, when the chips are automatically recognized, the coolant is ejected to the place where the chips are present in the machine tool, in accordance with the position of the chips on the captured image.

Figure 5A:
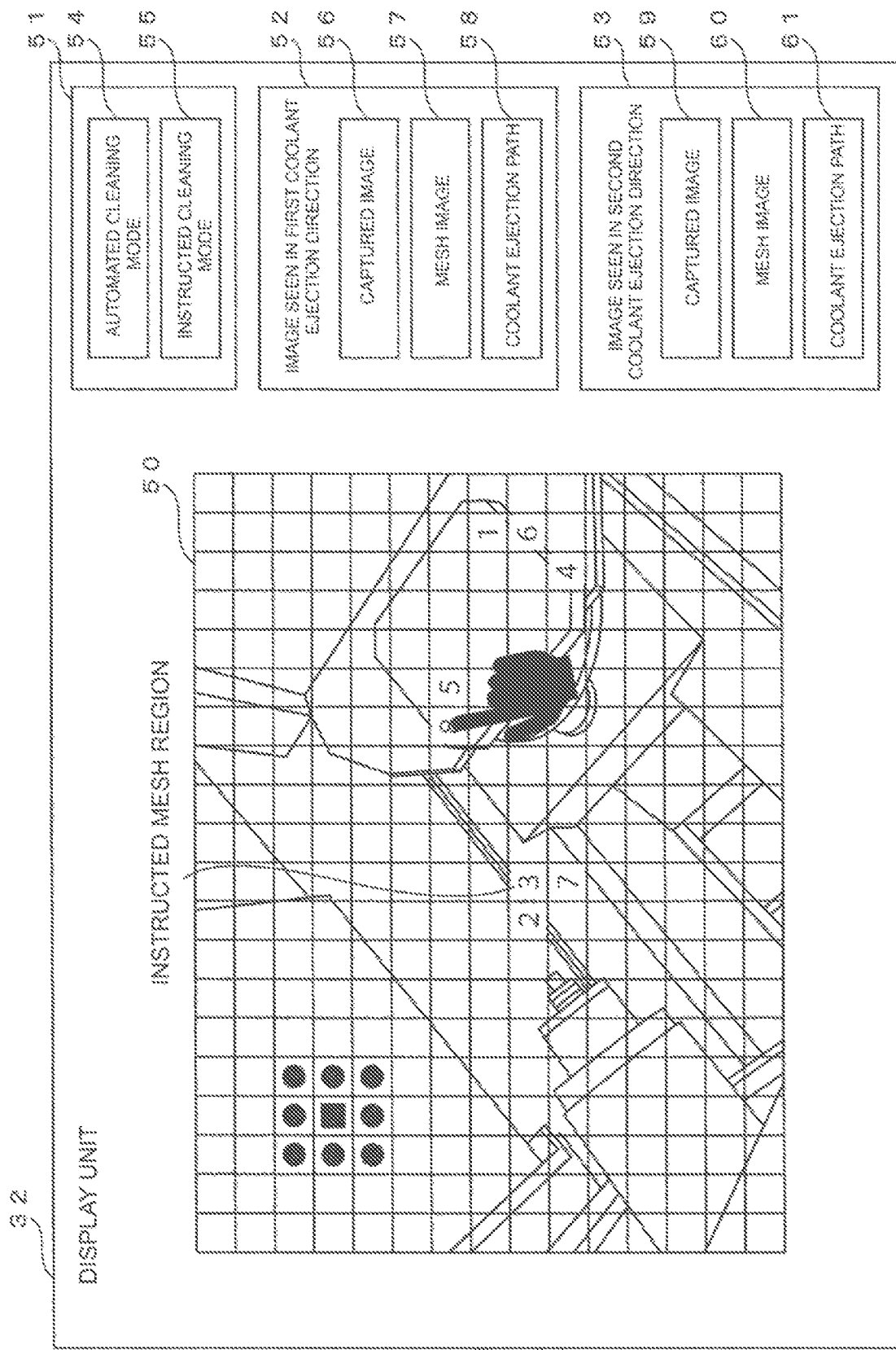
FIG. 5A A diagram illustrating an example of a display unit of a machining system displaying a coolant ejection path.
Figure 5B:
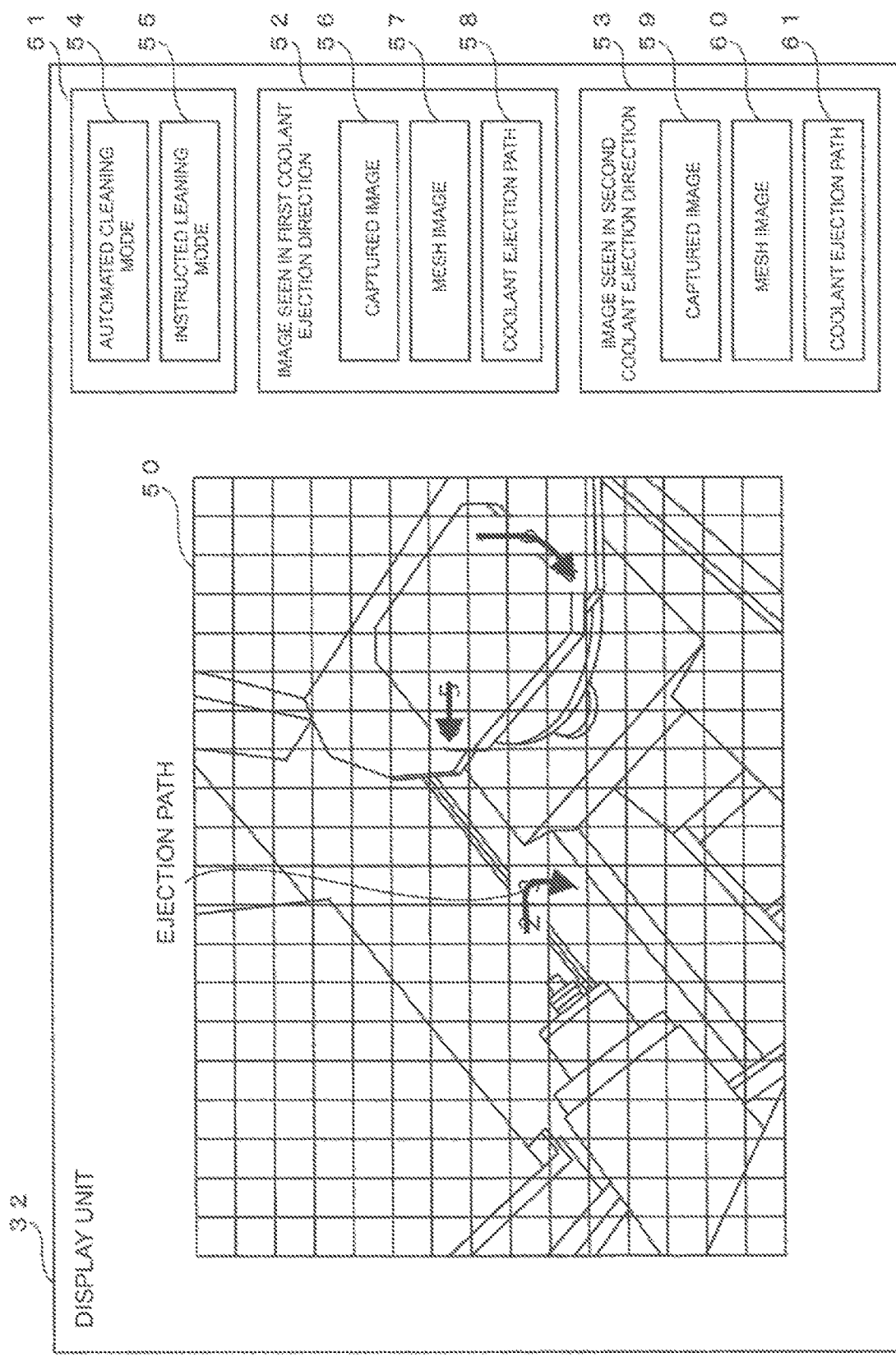
FIG. 5B A diagram illustrating an example of a display unit of a machining system displaying a coolant ejection path, which corresponds to the coolant ejection path of FIG. 5A.

The signal generation unit 39 can create a coolant ejection path on the basis of the instructed positions, irrespective of the instructed order. Hereinafter, this method is referred to as a second ejection path creation method. In FIG. 5A, like in FIG. 4A, the position instruction made by the operator is reflected on the mesh image, and the screen section 50 of FIG. 5A indicates a mesh region different from the screen section 50 of FIG. 4A. FIG. 5B shows an example of the coolant ejection path created by the second ejection path creation method, on the mesh region in FIG. 5A. In the present method, adjacent mesh regions are set as a group, and an ejection path passing through all the mesh regions set as the group is formed on the basis of a predetermined algorithm. In FIG. 5A, a mesh region 6 is adjacent to a mesh region 1, but a mesh region 4 is not adjacent thereto. The mesh region 4 is adjacent to the mesh region 6 in an oblique direction. The mesh regions 1 and 6 are adjacent to each other, while the mesh regions 6 and 4 are adjacent to each other. Hence, these three mesh regions are handled as a group of adjacent mesh regions. The ejection path can be created, for example, so as to start from a mesh region instructed first in a group of mesh regions, which is taken as a start point, and end at a mesh region distanced farthest from the start point. Alternatively, the ejection path may be formed with two mesh regions furthest away from each other in a group of mesh regions set as a start point and an end point. When there are a plurality of groups of input signals, one ejection path is formed for each group. In FIG. 5A, mesh regions each denoted by a black circle (•) are adjacent to a mesh region denoted by a black square (■), which are defined as adjacent mesh regions. As long as the adjacency continues, they are collectively referred to as a group of mesh regions.

Likewise as above, the created ejection path can be displayed on the display unit 32 and confirmed by the operator. Therefore, when the ejection path is the same as assumed, the operator can instruct to eject a coolant, and when the ejection path is different from the assumed, the operator can cancel the displayed ejection path and instruct positions again to the display unit 32. It may be configured such that the ejection path can be manually corrected. In order to add an ejection path, it may be configured such that positions can be instructed successively to the display unit 32. The display device 30 or the information processing device 30X may be configured to select which of the two, i.e., the first and second ejection path creatin methods, is used when creating a coolant ejection path. The created ejection path is stored in the storage unit 33, and a control signal created on the basis of the ejection path is transmitted as necessary from the signal transmission unit 40 to the machine tool 10, so that a coolant can be ejected.

Both the first ejection path creation method and the second emission path creation method can be used without using a mesh. When a mesh is not used in the first ejection path creation method, the ejection path is formed so as to pass through a plurality of instructed positions on the display image in the order as instructed by the operator.

Figure 6A:
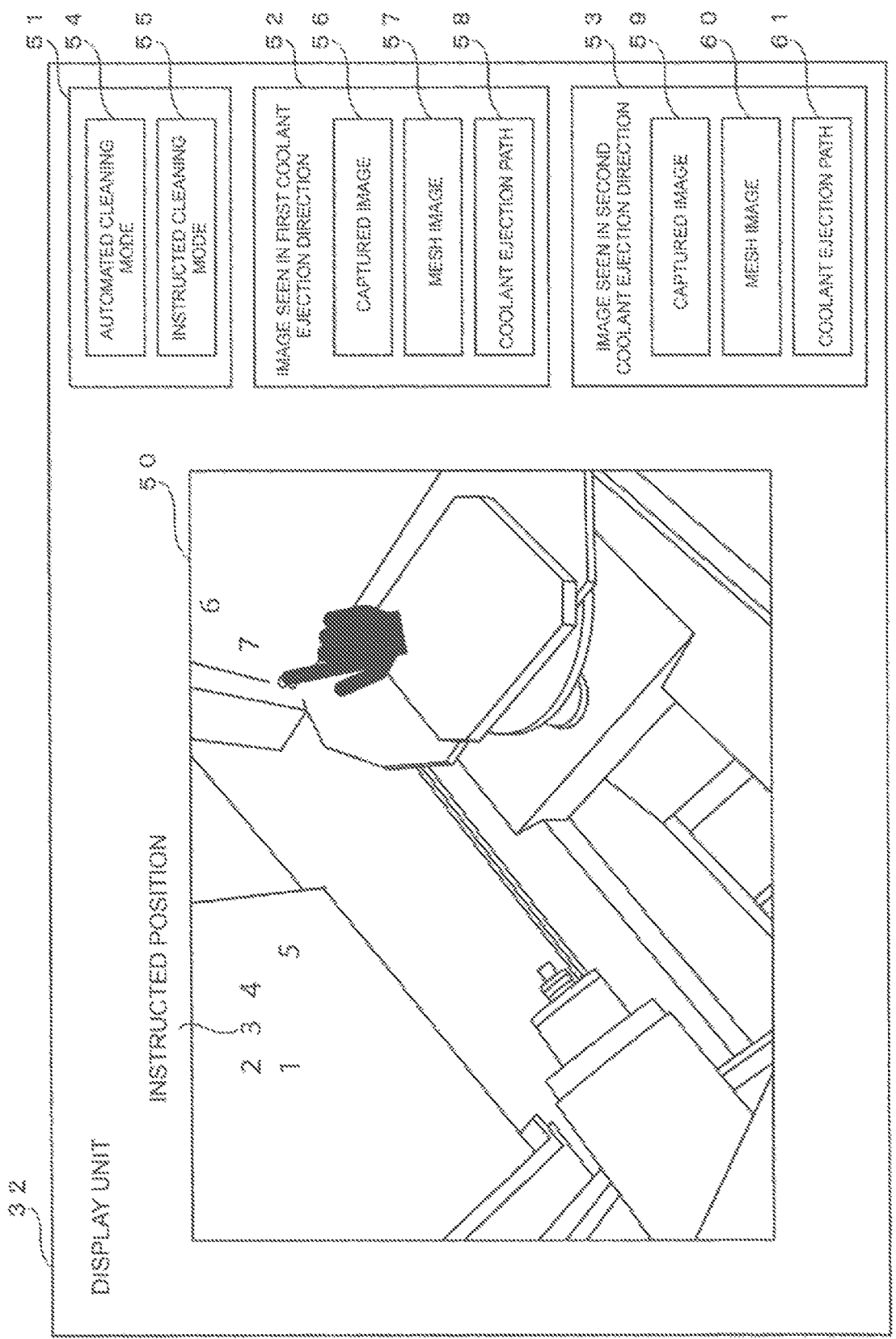
FIG. 6A A diagram illustrating an example of a display unit of a machining system displaying a coolant ejection path.
Figure 6B:
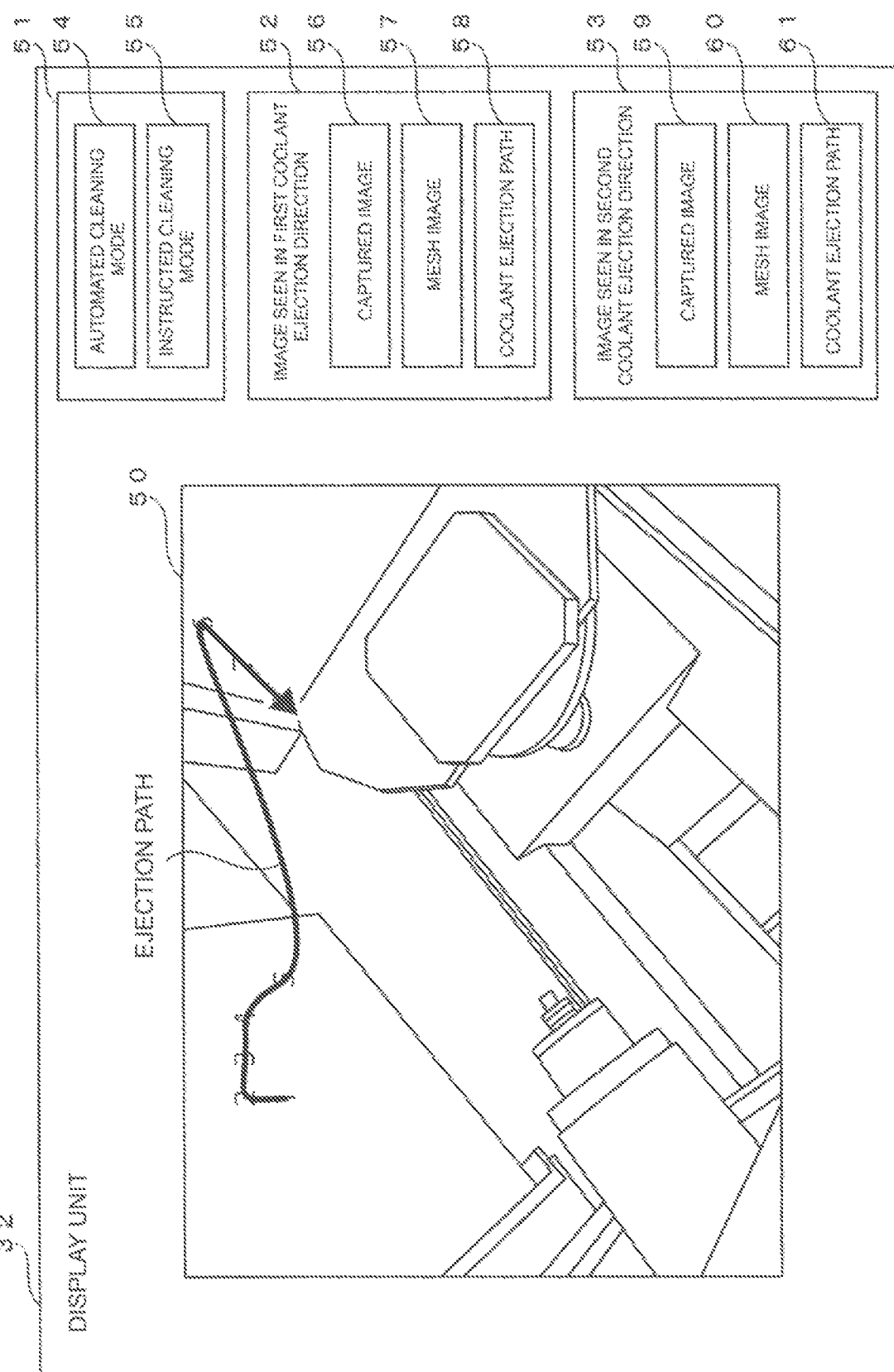
FIG. 6B A diagram illustrating an example of a display unit of a machining system displaying a coolant ejection path, which corresponds to the coolant ejection path of FIG. 6A.

In FIG. 6A, in the first emission path creation method, instead of using the mesh image as shown in FIG. 4A, the operator instructs coolant ejection positions on the captured image, and the instruction and the order thereof are displayed on the screen section 50. The positions marked with the numbers in FIG. 6A are positions instructed by the operator, and the number increases in the order as instructed by the operator. As described above, when the detection unit 37 detects the positions instructed by the operator through the input unit 34 on the captured image displayed on the screen section 50, the signal generation unit 39 can create a coolant ejection path in the target area. When the coolant ejection path selection section 58 is selected, the coolant ejection path is displayed on the screen section 50 as shown in FIG. 6B.

When a mesh is not used in the second ejection path creation method, if there are one or more other instructed positions within a predetermined distance from the specific instructed position, they may be set as one group, and an ejection path passing through all the instructed positions set as the one group may be formed. For example, when the resolution of the image is 1920 by 1080, if there are one or more other instructed positions within 100 pixels from a certain instructed position, these instructed positions may be regarded as within a predetermined distance and set as one group. The predetermined distance is not limited to the above, and may be changed as appropriate. In addition, a region may be set for each component in the machine tool, and if there are a plurality of instructed positions in the region, they may be set as one group.

Furthermore, the operator may instruct predetermined positions by tracing like drawing a curve, on the image displayed on the display unit 32. In this case, the detection unit 37 detects input signals having successively input by the operator, and outputs the input signals to the signal generation unit 39 via the transmission unit 38. The signal generation unit 39 creates a coolant ejection path along the instructed curve, and generates a control signal that controls to eject a coolant on the basis of the ejection path.

An ejection path may be formed by an information processing device having at least the function of the aforementioned arithmetic unit 31. In this case, for example, the display unit 32 is connected to the information processing device by some communication means, and can detect the input signals or the like to create an ejection path. In the present embodiment, the signal generation unit 39 is included in the arithmetic unit 31 of the display device 30 or the information processing device 30X, but may be included in the machine tool 10 or may be included in a device other than the machining system 1, such as a cloud, which is connectable via any communication means.

(Control Example of First Ejection Path Creation Method)

Figure 7:
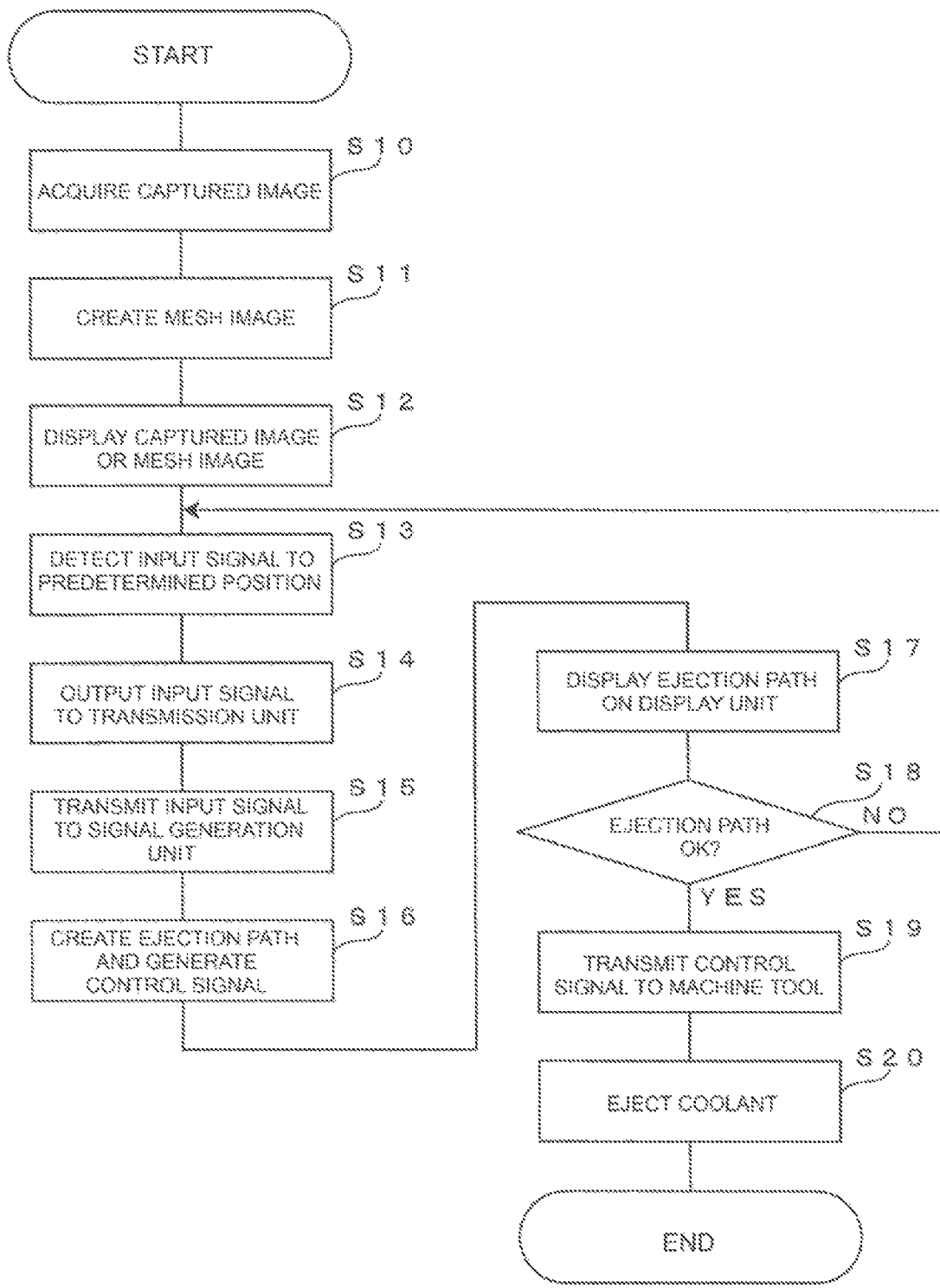
FIG. 7 A flowchart for explaining an operation of a machining system.

A control example of the first ejection path creation method of the machining system 1 according to the present embodiment will be described below, with reference to the flowchart of FIG. 7. FIG. 7 is a flowchart showing an operation example according to the first ejection path creation method in the machining system 1 in the present embodiment.

First, the imaging unit 12 of the machine tool 10 captures an image, and the acquisition unit 35 of the display device 30 or the information processing device 30X acquires the captured image (S10). The mesh division unit 36 divides the captured image acquired in step S10 into mesh regions, to create a mesh image (S11). The display unit 32 displays the mesh image created in the step S11 or the captured image (S12).

When the operator recognizes the chips on the displayed image and instructs via the input unit 34 one or more positions (including the first position and the second position) to which a coolant is desired to be ejected, the detection unit 37 detects the instruction as an input signal to each of the positions (S13). Upon detection of each input signal, the detection unit 37 outputs the input signal to the transmission unit 38 (S14). The transmission unit 38 transmits each input signal to the signal generation unit 39 (S15).

The signal generation unit 39 creates a coolant ejection path in the target area reflecting the instructed order, on the basis of each input signal, and generates a control signal that controls to emit a coolant on the basis of the ejection path (S16). The display unit 32 displays the created ejection path, together with the captured image or the mesh image (S17). The operator confirms the ejection path, and if there is a problem, the process returns to the step S13 (S18). If there is no problem, the signal transmission unit 40 transmits the generated control signal to the machine tool 10 or 10X (S19), and the machine tool ejects a coolant by driving the nozzle so as to eject the coolant forward along the tangential direction of the ejection path (S20), and then, the process ends. The foregoing is a process of creating a coolant ejection path by the first ejection path creation method.

(Control Example of Second Ejection Path Creation Method)

Figure 8:
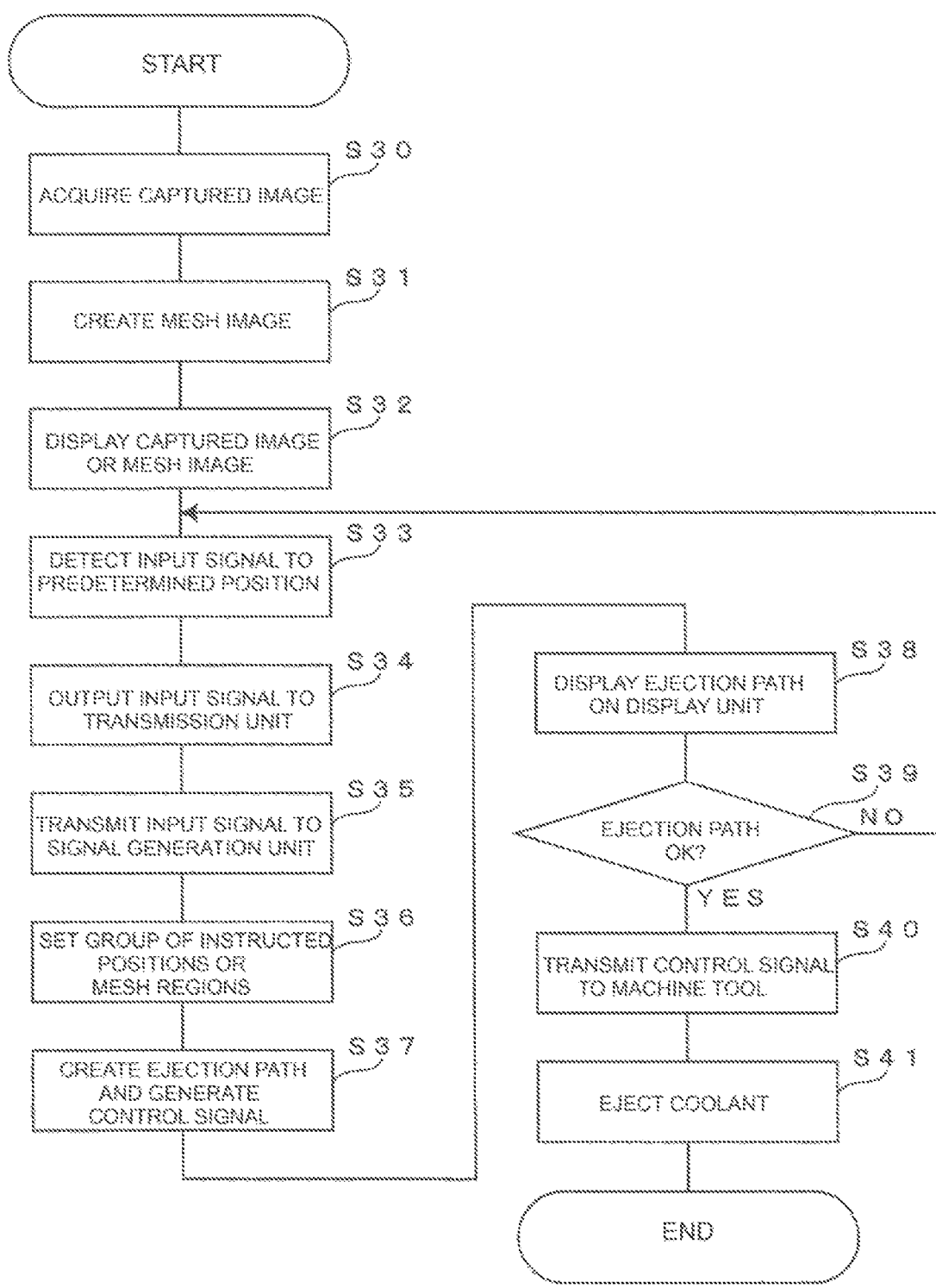
FIG. 8 A flowchart for explaining an operation of a machining system.

Next, a control example of the second ejection path creation method of the machining system 1 according to the present embodiment will be described below, with reference to the flowchart of FIG. 8. FIG. 8 is a flowchart showing an operation example according to the second ejection path creation method in the machining system 1 in the present embodiment.

First, the imaging unit 12 of the machine tool 10 captures an image, and the acquisition unit 35 of the display device 30 or the information processing device 30X acquires the captured image (S30). The mesh division unit 36 divides the captured image acquired in step S30 into mesh regions, to create a mesh image (S31). The display unit 32 displays the mesh image created in step S31 or the captured image (S32).

When the operator recognizes the chips on the displayed image and instructs via the input unit 34 one or more positions (including the first position and the second position) to which a coolant is desired to be ejected, the detection unit 37 detects the instruction as an input signal to each of the positions (S33). Upon detection of each input signal, the detection unit 37 outputs the input signal to the transmission unit 38 (S34). The transmission unit 38 transmits each input signal to the signal generation unit 39 (S35).

When instruction is made on the mesh image, the signal generation unit 39 sets adjacent mesh region as a group of mesh regions on the basis of each input signal. When instruction is made on the captured image, if there are one or more other instructed positions within a predetermined distance, they are set as a group of instructed positions (S36). Then, a coolant ejection path in the target area passing through all the instructed positions or the mesh regions set as the group is created, and a control signal is generated (S37). The display unit 32 displays the created ejection path, together with the captured image or the mesh image (S38). The operator confirms the ejection path, and if there is a problem, the process returns to the step S33 (S39). If there is no problem, the signal transmission unit 40 transmits the generated control signal to the machine tool 10 or 10X (S40), and the machine tool ejects a coolant by driving the nozzle so as to eject the coolant forward along the tangential direction of the ejection path (S41), and then, the process ends. The foregoing is a process of creating a coolant ejection path by the second ejection path creation method.

The display device, the machine tool, and the liquid ejection method according to the present disclosure are implemented in cooperation with a hardware resource, such as a processor, a memory, and a program. The present disclosure is not limited to the illustrated embodiment, and various improvements and modifications in design can be made without departing from the essence of the present disclosure.

REFERENCE SIGNS LIST 1, 1X machining system
10, 10X machine tool
11 liquid ejection unit
12 imaging unit
30 display device
30X information processing device
32 display unit
36 mesh division unit
37 detection unit
38 transmission unit
39 signal generation unit

The invention claimed is:

1. A display device for displaying an image in order to eject a liquid and move chips generated from a workpiece in a machine tool, the machine tool including a liquid ejection unit that ejects a liquid so as to move chips generated from a workpiece, and an imaging unit that captures an image of a target area in which chips generated from a workpiece are to be detected in the machine tool, wherein the liquid is ejected to the target area, based on a first position and a second position in the image captured by the imaging unit, the display device comprising:
   a display unit that displays an image captured by the imaging unit;
   a detection unit that detects a first input signal corresponding to the first position in the image displayed on the display unit, and a second input signal corresponding to the second position in the displayed image; and
   a transmission unit that transmits the detected first input signal and the detected second input signal to a signal generation unit, the signal generation unit generating a control signal that controls to create a liquid ejection path in the target area, based on the first position and the second position, for ejecting a liquid, based on the liquid ejection path,
   wherein the display unit displays (a) the image captured by the imaging unit, (b) the first position, (c) the second position, and (d) the liquid ejection path in a superimposed manner, the liquid ejection path connecting the first position and the second position.

2. The display device according to claim 1, wherein the signal generation unit creates the ejection path, based on an order in which the first input signal and the second input signal are input.

3. The display device according to claim 1, wherein when the first position and the second position are within a predetermined distance, the signal generation unit sets the first position and the second position as a group of positions, and creates the ejection path corresponding to the group of positions.

4. The display device according to claim 1, further comprising a mesh division unit that creates a plurality of mesh regions in at least part of the image captured by the imaging unit, wherein the detection unit detects an input signal corresponding to a predetermined position, based on the mesh regions.

5. A machine tool, comprising:
   a liquid ejection unit that ejects a liquid so as to move chips generated from a workpiece;
   an imaging unit that captures an image of a target area in which chips generated from a workpiece are to be detected in the machine tool;
   a display unit that displays an image captured by the imaging unit;
   a detection unit that detects a first input signal corresponding to a first position in the image displayed on the display unit, and a second input signal corresponding to a second position in the image; and
   a transmission unit that transmits the detected first input signal and the detected second input signal to a signal generation unit, the signal generation unit generating a control signal that controls to create a liquid ejection path in the target area, based on the first position and the second position, for ejecting a liquid, based on the liquid ejection path,
   wherein the display unit displays (a) the image captured by the imaging unit, (b) the first position, (c) the second position, and (d) the liquid ejection path in a superimposed manner, the liquid ejection path connecting the first position and the second position.

6. A liquid ejection method for ejecting a liquid so as to move chips generated from a workpiece, the method comprising steps of:
   displaying a captured image;
   detecting a first input signal corresponding to a first position in the displayed image, and a second input signal corresponding to a second position in the displayed image; and
   transmitting the detected first input signal and the detected second input signal, for generating a control signal that controls to create a liquid ejection path in the target area, based on the first position and the second position, for ejecting a liquid, based on the liquid ejection path,
   wherein the display unit displays (a) the image captured by the imaging unit, (b) the first position, (c) the second position, and (d) the liquid ejection path in a superimposed manner, the liquid ejection path connecting the first position and the second position.

* * * * *